Figure 1:
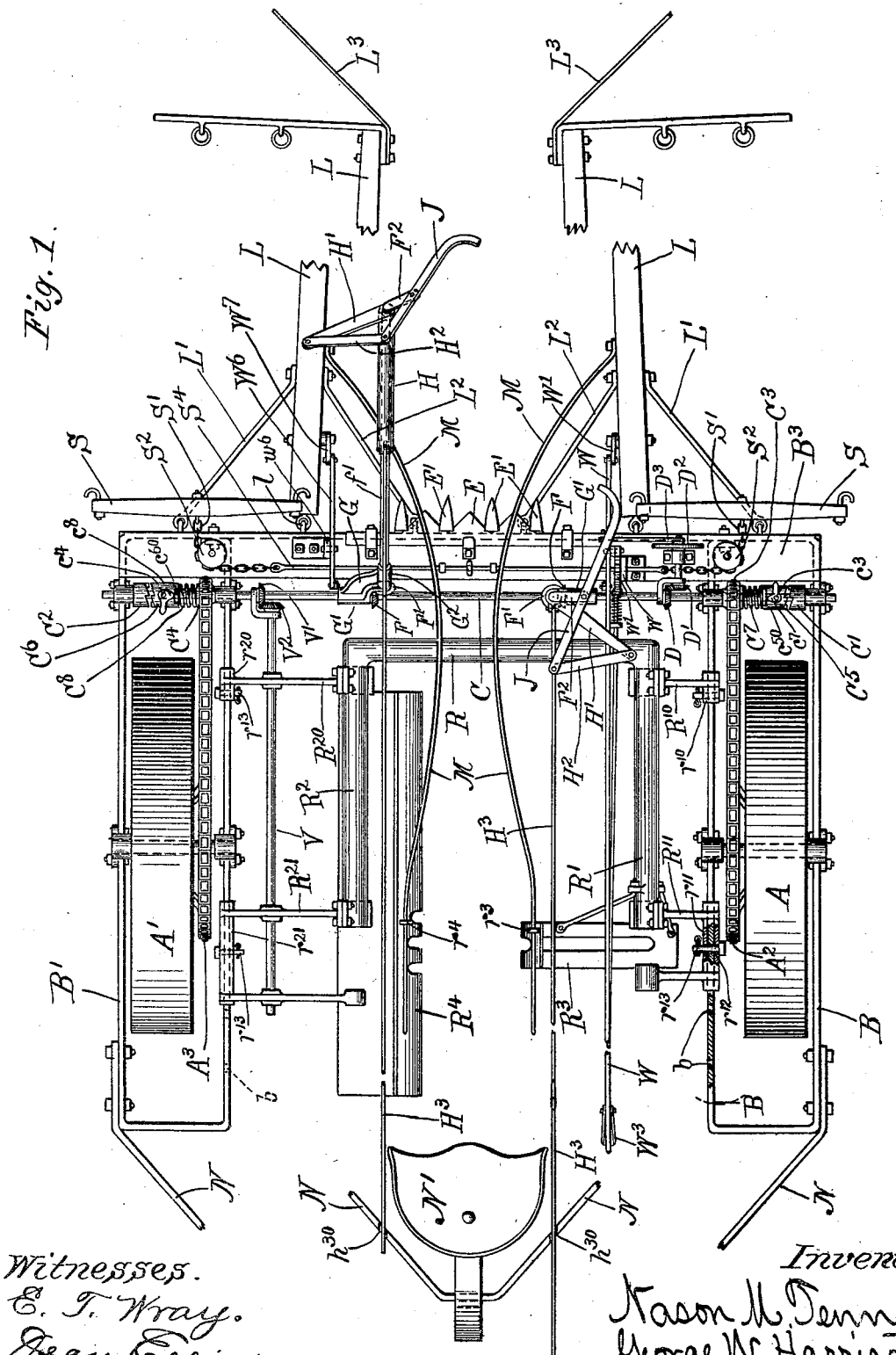

(No Model.) 3 Sheets—Sheet 1.

N. M. TENNEY & G. W. HARRISON.
CORN HARVESTER.

No. 521,058. Patented June 5, 1894.

Witnesses.
E. T. Wray.
Jean Elliott

Inventors.
Nason M. Tenney
George W. Harrison
By Burton and Burton their Attys (No Model.) 3 Sheets—Sheet 2.
N. M. TENNEY & G. W. HARRISON.
CORN HARVESTER.
No. 521,058. Patented June 5, 1894.
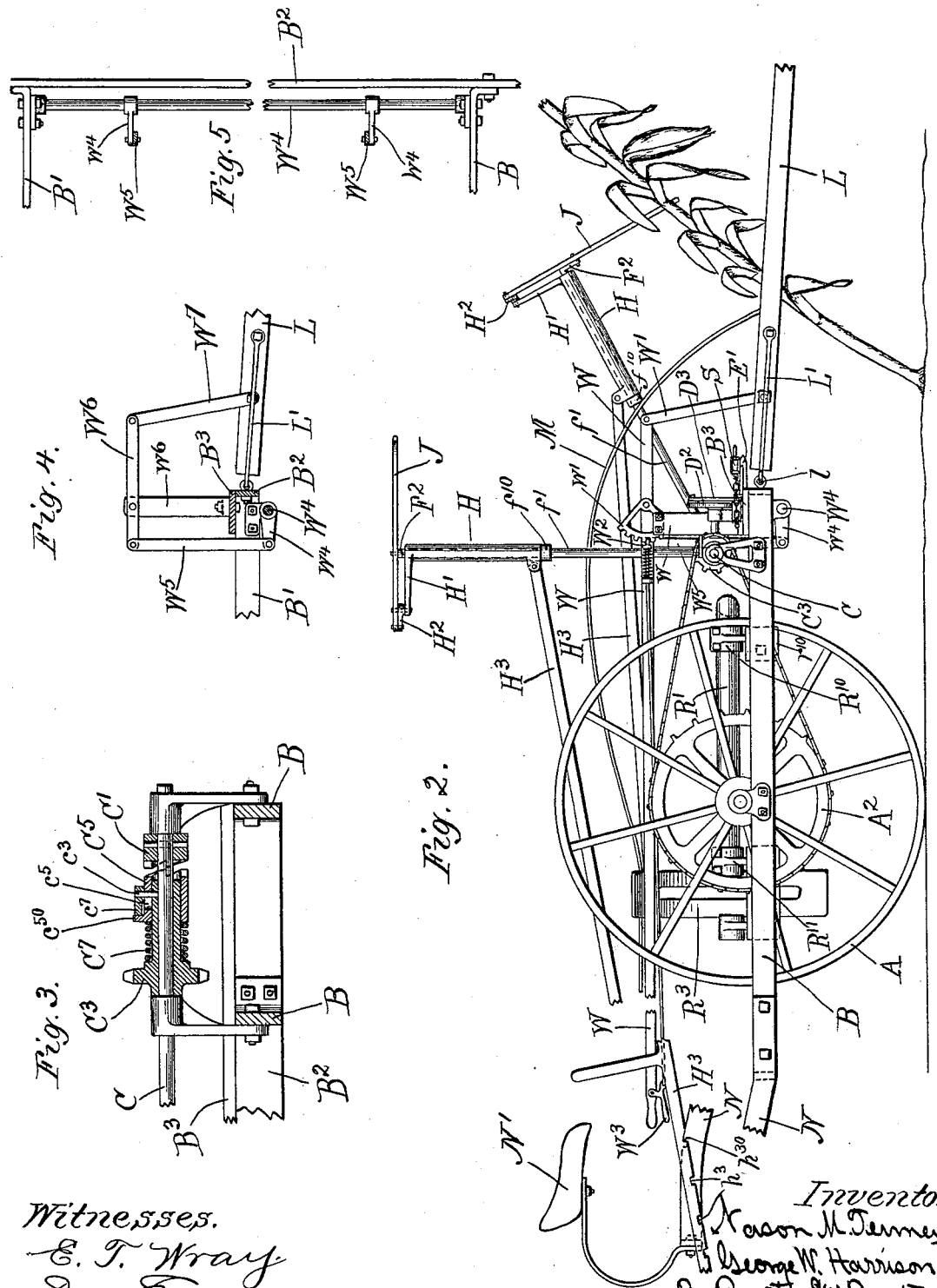
Witnesses.
E. T. Wray
Jean Elliott
Inventors
Nason M. Tenney
George W. Harrison
By Burton and Burton
their attys

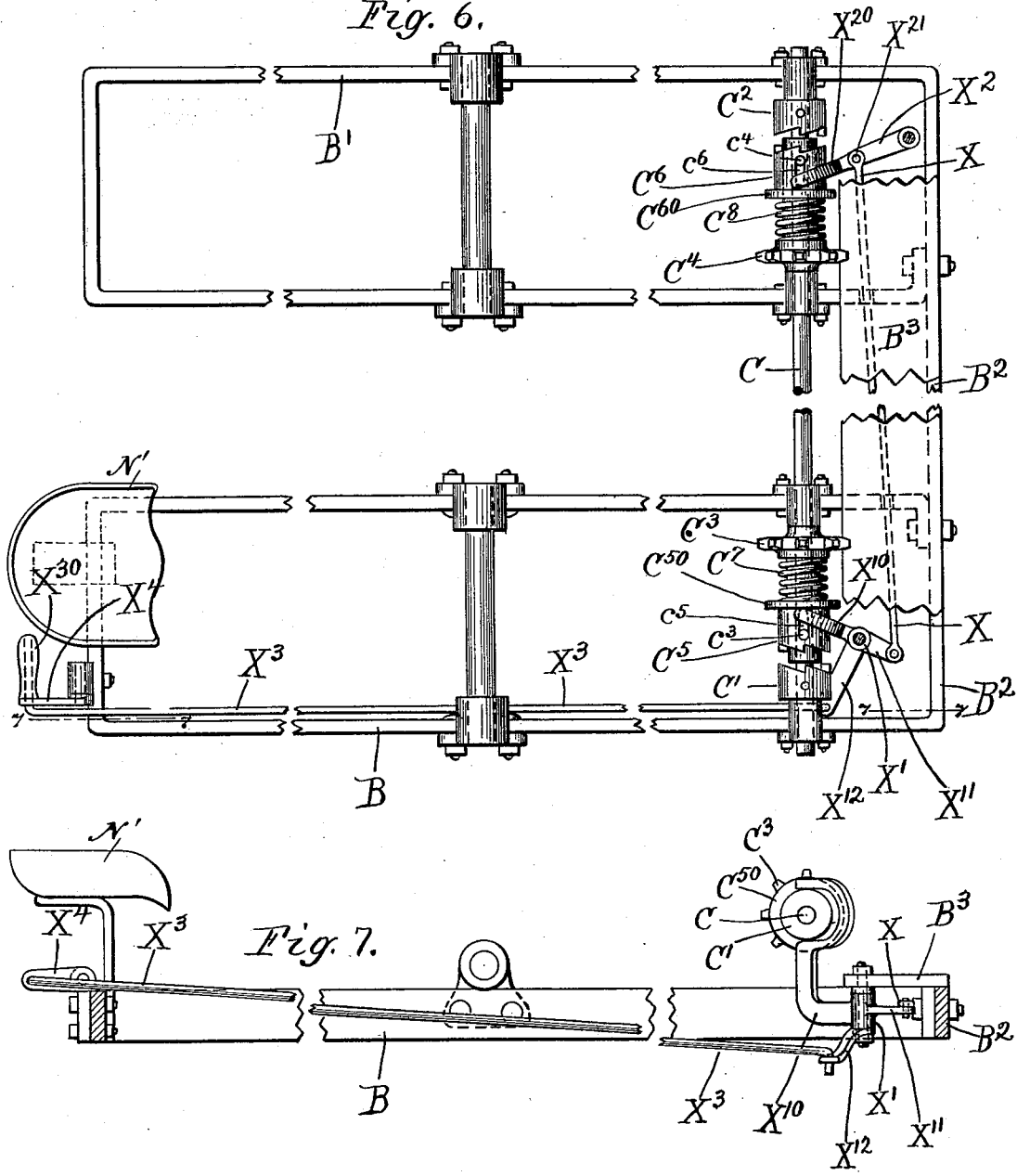

UNITED STATES PATENT OFFICE.

NASON M. TENNEY AND GEORGE W. HARRISON, OF PLANO, ILLINOIS.

CORN-HARVESTER.

SPECIFICATION forming part of Letters Patent No. 521,058, dated June 5, 1894.

Application filed March 18, 1893. Serial No. 466,673. (No model.)

*To all whom it may concern:*

Be it known that we, NASON M. TENNEY and GEORGE W. HARRISON, citizens of the United States, residing at Plano, county of Kendall, and State of Illinois, have invented certain new and useful Improvements in Corn-Harvesters, which are fully set forth in the following specification, reference being had to the accompanying drawings, forming a part thereof.

In the drawings,—Figure 1 is a plan of our improved corn harvester, the binding mechanism being omitted because not a part of our invention, only the binder frame being shown. Fig. 2 is a side elevation of the same. Fig. 3 is a detail section of the clutch mechanism, axially with respect to the shaft. Fig. 4 is a detail elevation of the tilting mechanism. Fig. 5 is a detail plan of a rock-shaft and connections forming part of said tilting mechanism. Fig. 6 is a plan of the wheel frames and their connecting sill partly broken away, and the main power shaft and clutch mechanism thereon. Fig. 7 is a side elevation of the same parts, the outer side bar of the wheel frame being cut away at the plane indicated by the line 7—7 on Fig. 6, together with the journal boxes thereon and the driver's seat being shown in a position which dispenses wholly with transverse connections between the wheel frames at the rear.

Our improved corn harvester is designed to be drawn by two horses walking on opposite sides of the row of corn which is to be cut, and it comprises, therefore, a bifurcated or double tongue or pole, one member of which extends upon each side of the row of standing corn, the sickle or corn-cutting device, of whatever nature, being located between the two poles or members of the bifurcated pole. The machine has also two traction-wheels, which constitute also its supporting wheels, and these wheels travel on opposite sides of the row of corn which is being operated upon, and the mechanism is adapted to transmit power from both these wheels to the main power shaft, so that when the machine is traveling directly forward, the traction of both wheels is available for power; and when the machine is turning or otherwise traveling so that one wheel revolves faster than the other, or so that one wheel only is revolving forward, the other being revolved backward, the wheel which is revolving forward,—or when both are revolving forward, the one which has the more rapid motion,—alone drives the machinery. The binder is located between the two traction-wheels and directly in rear of the sickle, and the cut stalks are delivered directly from the sickle into the binder rearward in the line of travel of the machine, and passed through the binder directly to the ground when bound. This construction practically necessitates a separate frame for each drive-wheel, both frames being connected at the front, making the entire frame of the harvester, comprising these two wheel frames, bifurcated open rearward as the draft pole is bifurcated open forward, the connecting neck being at the finger bar upon which the sickle operates. Upon this general outline of the construction, the details may be more readily understood, and will now be described.

A and A' are respectively the right-hand and left-hand traction-wheels.

B and B' are respectively the right-hand and left-hand wheel-frames. These wheel-frames encompass respectively the traction-wheels A and A', the latter being journaled upon the frames in a simple manner. The two frames B and B' may be constructed of a continuous iron bar folded up in the form of the two frames, the middle portion of the bar, $B^2$, extending across from the front end of one frame to the front end of the other, and constituting part of the connecting neck of the entire harvester frame. Further stiffness is given to this neck by a horizontal metal plate $B^3$ applied upon the upper side of the transversely extending portion $B^2$, and lapping across both the frames B and B' at the forward part where any suitable means of rigid connection may be employed to unite the plate $B^3$ strongly to the frames B and B' and the neck $B^2$. Upon the drive-wheels A and A' there are formed or rigidly mounted power-communicating wheels, commonly termed the master-wheels, $A^2$ and $A^3$. These are preferably sprocket-wheels because chain-driving is the preferable mode of driving in our machine as constructed.

C is a shaft extending horizontally across the entire machine at the forward part a little rearward of the plate $B^3$, and journaled upon the frames B and B'. Near the bearings of this shaft on the outer bars of said frames respectively there are secured rigidly to it the outer members C' and C² of clutches, the other members of which will be hereinafter described. Upon said shaft C adjacent to the inner side bars of the frames B and B' there are loosely mounted sprocket-wheels C³ and C⁴, whose hubs project outward and have mounted upon them the clutch sleeves C⁵ and C⁶, back of which are springs C⁷ and C⁸ tending to throw the clutch sleeves into engagement with the clutch members C' and C². The sleeves C⁵ and C⁶ are kept from revolving on the hubs of the sprocket-wheels and adapted to slide thereon by means of studs $c^3$ and $c^4$ rooted in the hubs respectively, and projecting through slots $c^5$ and $c^6$ in the sleeves C⁵ and C⁶, the length of the slots being sufficient to permit the range of movement necessary to engage and disengage the clutches. Eccentrics $c^7$ and $c^8$ are pivoted on the projecting ends of the studs $c^3$ and $c^4$ and operate at their eccentric peripheries against the upstanding bosses $c^{50}$ and $c^{60}$ at the inner ends of the slots $c^5$ and $c^6$ to crowd the sleeves against the tension of the springs out of engagement with the other members of the clutch sleeves. The two clutches are respectively right-hand and left-hand in their engagement, so that the rotation of the sprocket-wheels C³ and C⁴, caused by the forward rotation of the drive-wheels, drives the shaft, and the reverse motion of either drive-wheel causes the corresponding clutch to slip and to not drive the shaft.

D is a beveled pinion on the shaft C.

D' is a beveled pinion meshing with the pinion D and journaled on the plate B³, and having at the forward end of its shaft the sickle crank-wheel D², which drives the sickle E by means of the pitman D³ in the customary manner. The guard fingers E' of the sickle are mounted on the plate B³, which thus becomes the finger bar and may be sometimes referred to by that term. The construction thus far described, it will be seen, is such that the sickle derives power from both traction wheels when the machine is running straight forward, and that when the machine is turning, the motion will still be continued, being derived from whichever wheel is revolving forward, so that the action of the sickle is unaffected by the direction of motion except when that motion is wholly rearward, in which case both clutches slip and the sickle stands still.

We will now describe the mechanism designed to lift the stalks when they are prostrated or leaning, and also to gather them rearward for the action of the sickle. This device consists of an arm operated with an oscillating and reciprocating movement whereby it is adapted to thrust its point sideward with respect to the line of travel to enter in front of or under the stalks and then move rearward,—sideward with respect to the extent of the arm,—to uplift and carry rearward the stalks engaged by it in its sideward movement. One such device is employed upon each side of the row of stalks, and the entire device is so connected to the driving-train and its supports on the harvester that it may be tilted forward or rearward to cause it to operate at any desired point according to the condition of the stalks, whether upright or prostrated or leaning. This device is as follows, one only being referred to in the following description, both being alike, as shown in the drawings:

F is a beveled pinion on the shaft C about rearward of the extreme guard finger of the sickle.

F' is a beveled pinion meshing with and driven by the pinion F.

G is a yoke which has a bearing G' on the shaft C, and a bearing G² for the shaft $f'$ of the pinion F'. Both the bearings G' and G² are quite long, for reasons which will appear when the use of the device is considered. The shaft $f'$ extends upward and is provided at its upper part with a long sleeve H above which the shaft carries the crank $f^2$. A collar $f^{10}$ on the shaft $f'$ upholds the sleeve H so that at its upper end it is stopped against the hub of the crank F². The sleeve F has at its upper end, and therefore just below the crank F², an arm H' projecting at right angles to the axis of the sleeve; and a link H² from the end of this arm is connected to the end of the stalk-gathering and lifting-arm J, said arm being pivotally connected, at a point intermediate its connection with the link H², upon the wrist of the crank F². The character of movement given to the stalk-lifting arm J by the crank and link connection described will be readily understood as being an oscillating and reciprocating movement as above stated, the particular path of the forward end of the stalk-lifting arm being determined by the relations of the several pivotal connections between the arm and its operating and guiding parts.

From the sleeve H a rod H³ pivotally connected with the sleeve in any convenient manner extends rearward to a point near the driver's seat, said rod being suitably notched at $h^3$ adapting it to be lodged at different points upon a suitable stop as $h^{30}$, provided for it in any convenient position near the seat support, so that the driver can at will tilt the shaft $f'$ and all the parts mounted thereon concerned in the operation of the stalk-lifting arm J, to cause the said arm to operate at any desired point, between that in which it will operate when the sleeve is thrown down to horizontal position, and that which it will obtain when the arm is upright or rearwardly inclined. The forward end of the arm J is preferably curved inward to give it facility for engaging and holding stalks as it sweeps sideward, under or in front of them.

It will be understood that one of the stalk-lifting devices may be operated in one position while the other at the opposite side of the row is operated in another position. One of the arms J may therefore be lifting prostrate stalks while the other is adjusted to such position that it will take the stalks brought up by the first and carry them farther up and rearward so that when cut by the sickle they will fall rearward across the harvester neck in the binder. We do not, however, limit ourselves to using the two arms thus co-operatively and successively; on the contrary both may be operated at the same position, either to lift or to prostrate the stalks. The chief purpose, however, to which they are adapted is the former, that is lifting and gathering rearward the stalks before the sickle reaches them, and any familiar mechanism which may be deemed necessary to reliably prostrate the cut stalks into the binder may be employed without departing from our invention.

L L are the two poles or tongues, or members of what may be termed a bifurcated or divided tongue. They are pivoted each to the forward side of the harvester frame, as seen at $l$, and suitably braced by the rods $L'$ $L^2$, the latter extending inward to a point directly under the extreme guard finger and constituting to some extent a gathering device which will operate upon the lower part of the stalks to gather them in toward the sickle when they stand spread or scattered in the hill. For the further purpose of gathering the sprawling or spreading stalks by the mere advance movement of the machine, the tongues L L which at their forward end are only a few inches apart,—twelve or fourteen inches opening being sufficient,—are provided with forwardly diverging branches or gathering-arms $L^3$ $L^3$. These arms $L^3$ spread widely enough to take in any ordinarily spreading clump of corn stalks and cause them all to enter between the poles and so to come within the range of action of the other gathering and the cutting devices. Further to assist in the same result and also to more completely control the position of the stalks when they are so few that they will not occupy the entire space provided for their path to the binder, we provide the rods or gathering arms M M, which are connected to the inner sides of the poles L L at a point somewhat forward of the inner braces $L^2$, and thence extend with an inward and upward curvature over the sickle, and thence rearward over the binder space and lodging respectively against the binder breast-plate, and the binder deck or counter guard plate hereinafter referred to. These gathering arms M M are curved so that at the point where they extend directly above the sickle they are quite close together normally, so that even though there may be but a few and slender stalks at a given time being passed between them, they will be close enough together to hold such stalks in good position for the action of the sickle and to cause them to fall straight and approximately parallel into the binder. The arms M are sufficiently yielding also to allow them to be forced apart by a heavier body of stalks which may enter between them so that the throat which they constitute leading into the binder when open to the full width will be equal to the full cutting capacity of the sickle.

For the purpose of equalizing the draft in this machine we connect the whiffle-trees S S to chains $S'$ $S'$ which pass around guide pulleys or sheaves $S^2$ $S^2$ mounted on the plate $B^3$ and connected across the neck of the machine behind the sickle by the rod $S^4$, suitable stops being provided to limit the play of the rod transversely as the position of the horses may vary. Ordinarily it is intended that the driver shall occupy a position directly behind the row of stalks which is being cut, that is midway before the fore-and-aft lines of travel of the drive-wheels, and for that purpose a seat support is formed by the bars N N extended from the rear ends of the drive-wheel frames respectively to a point midway between their lines of travel, at which point the seat N is mounted as shown. When the machine is being used for cutting very tall corn this position of the seat is impracticable and it will be shifted to a position at the rear of one of the frames as shown in Figs. 6 and 7, and if necessary the bars N N may be removed leaving the machine entirely open at the rear.

We will now describe the relation of the binder to the general structure above explained. It is designed that the stalks being cut will trip over the neck of the frame in the rear of the sickle and fall rearward between the drive-wheel frames, and the binder is located in such position that the stalks will be received by it as they thus fall, the intention being that the usual trip-arm or drop-gate and binding cord alone will receive the stalks and hold them until the bundle is accumulated and bound, whereupon the bundle will fall directly to the ground through the open space of the binder-frame, the obstruction in the shape of the trip and cord being at that stage withdrawn. It will be seen that in order to operate in this manner any ordinary U-frame binder suitably supported in the space between the drive-wheel frames with its standard parallel with the sickle and neck of the harvester-frame, and in the rear of the latter, may be employed, provided the mechanism which transmits power between the two shafts,—to wit, the needle rock-shaft and the knotter actuating wheel shaft which extend through the two arms of the U-frame,—is not of such a nature as to constitute an obstruction to the passage of the butts, or as to be interfered with by the passage of the stalks over it. In so far as the binder is illustrated in this application it is of a form which meets this condition, being that of a binder patented to Benjamin F. Stewart, No. 473,976, dated May 3, 1892.

The construction of the binder being no part of this invention it is not herein illustrated. The mode of supporting the binder frame and certain functions of the frame in its position are, however, material to the invention, and will be described.

To the two arms $R'$ $R^2$ of the U-frame whose trunk R extends in the position above described with respect to the sickle and main frame neck, there are made fast and may be formed integrally with it the bracket arms $R^{10}$ $R^{11}$ and $R^{20}$ $R^{21}$ projecting respectively toward the two wheel frames B and B' and at their outer extremities provided with sleeves or bearings $r^{10}$ $r^{11}$ $r^{20}$ $r^{21}$, by which they are adapted to slide on the inner side bars of said wheel-frames B and B' respectively. These bracket-arms are provided with all necessary bearings for any other shafts and working parts of the binding mechanism besides the two principal shafts which obtain their customary bearings in the arms $R'$ and $R^2$ of the U-frame. The whole binder frame, therefore, comprising the U-frame and these bracket-arms is adapted to be adjusted bodily fore-and-aft to any desired position within the limits of the wheel-frames according to the length of stalks being handled by the machine. The side-bars of the frames B and B' may be provided with a number of holes, as seen at $b$, and the sleeves of one of the bracket-arms on each side of the U-frame may be provided with corresponding holes as $r^{12}$, through which locking pins $r^{13}$ may be inserted to secure the binder frame in any position to which it may be adjusted on the main frame. The breast-plate will occupy the customary position with respect to the U-frame and knotter actuating shaft, and is shown at $R^3$. The part which in the ordinary position of a grain binder is called the deck becomes in the position in which it is used in our machine a counter-plate through which the packers and binder-arm may operate and is represented at $R^4$. The gathering-arms or guards M M extend between the breast-plate and counter-plate and are adapted to rest against the said plates respectively, and may be provided with guide eyes $r^3$ and $r^4$ on the plates as shown. The main frame consisting of the two traction-wheel frames connected by the cross neck, making a rearwardly open bifurcated structure being liable to spring considerably, is stiffened and the two laterally separated members B and B' are rendered more rigid with respect to each other by the binder frame, which is commonly of cast-iron, located as described between the two members B and B' and connected with said members in a manner which makes it rigid with them both except as it is adapted to slide fore-and-aft; so that all the rigidity of the binder-frame as against lateral separation or springing of its arms avails to stiffen the entire structure and retain the two members B and B' parallel.

It is desirable that the power for the work done should be derived from the two ends of the shaft C in as nearly equal portions as possible; that is, that said shaft should transmit power to secondary shafts through which the work is performed at points as near as possible to the points at which power is transmitted to said shaft C, so that the torsion of the shaft as an element of inaccuracy in the action may be eliminated as far as possible, and inasmuch as in ordinary operation when the machine is traveling directly forward the shaft C receives power equally from the chains running over the sprocket wheels $C^3$ $C^4$ near the bearings of the shaft on the opposite frames B and B', it is preferred to take power as described for driving the sickle by means of a pinion D located near one of said sprocket-wheels and to take power for the binder from a like pinion located near the other sprocket-wheel. Without, therefore, intending to illustrate the mechanism of the binder proper, we have shown the shaft V journaled in the bracket-arms $R^{20}$ $R^{21}$ at the opposite side from that at which the sickle is driven as described, beveled pinions $V'$ on the shaft C and $V^2$ on the shaft V constituting the driving connection with the shafts C and V. It will be obvious that from the shaft V power may be communicated to any mechanism which may be mounted on the binder frame and the whole binding operation will be performed by the power derived through that shaft.

For the purpose of tilting the machine, which is the only means of raising and lowering provided, a lever W is fulcrumed upon a post $w$ mounted on the plate $B^3$ rearward from the end of the right-hand tongue L and extended rearward to a convenient position for being operated by the driver and forward a suitable distance and is connected at the forward end by a link $W'$ with the tongue L. A suitably notched segment $w'$, rigid with the post $w$, about the fulcrum of the lever adapted to be engaged by a locking tooth $W^2$, operated in a familiar manner by thumb-lever $W^3$, serves to secure the tongue and frame at the angle to which they may be tilted by the lever. This device, so far as described, would operate upon only one of the tongues and might result in distortion of the frame or the other tongue, and to prevent the danger of such result as well as to render the tilting easier, a rock-shaft $W^4$ is preferably extended across the frame under the bar $B^3$ having two lever arms $w^4$ $w^4$, from which links $W^5$ $W^5$ extend, one to the lever W, the other to a lever $W^6$ similarly fulcrumed on a post $w^6$ in the rear of the opposite tongue L' and connected at its forward end by a link $w^7$ to said tongue L. This train of connections it will be seen adapts the lever W to communicate the tilting movement simultaneously to both tongues. We do not limit ourselves to the specific form and proportions of these levers and connections shown. They would necessarily be modified according to the weight of the different parts of the machine and to the degree to which it might be overbalanced forward or rearward, and the distance rearward from the post $w$ to which the lever W might extend. Well known equivalents for the simple lever W to keep the sweep of the operated end within practicable limits might be substituted without departing from our invention.

If it is considered desirable to provide for the disengaging of both of the clutches $C^5$ and $C^6$ at one action by the operator, in lieu of the shipping device described consisting of the eccentrics $c^7$ and $c^8$, we substitute the devices shown in Figs. 6 and 7, which we will now describe: The clutch sleeves $C^5$ and $C^6$ are in this case provided with annular flanges $C^{50}$ $C^{60}$ respectively, in lieu of the bosses $c^{50}$ and $c^{60}$. On the plate $B^3$, preferably below it at the right-hand side, there is fulcrumed a three-arm lever X', having one of its arms $X^{10}$, constituting a fork which strides the sleeve $C^5$ alongside of the flange $C^{50}$. Said lever has a forwardly extending arm $X^{11}$ from which a rod X extends across under the plate $B^3$ to the opposite side of the machine where it is connected at $X^{21}$ to a lever $X^2$, fulcrumed on the plate $B^3$ in the same manner as the lever X', and terminating rearwardly in a fork $X^{20}$ which strides the sleeve $C^6$ alongside its flange $C^{60}$. The lever X' has a third arm $X^{12}$ projecting outwardly, and a rod $X^3$ connected to said lever arm extends rearwardly just inside the outer side-bar of the frame passing under the axle of the drive-wheel upon that side, and thence rearward above the rear bar of the frame, where it is connected to a lever $X^4$ fulcrumed on the frame and tilting back and forth over it. The end of the rod $X^3$ bent sideward to connect with the lever is fitted with a handle $X^{30}$ by which the operator may tilt the lever $X^4$ rearward throwing it past the center to withdraw the clutches from engagement or forward to permit the springs to disengage the clutches respectively in a manner which will be obvious.

We claim—

1. In combination with a main frame having two traction wheels which support it and a sickle located between the paths of the wheels, a divided or double tongue whose members are hinged respectively at opposite sides of the path of the sickle; the rock shaft extending transversely behind the sickle and below the plane of the cut having lever arms at opposite sides of the path of the sickle; and links from said lever arms extending upward and levers fulcrumed on the frame outside the path of the sickle to which said links respectively are connected, and links from said levers to the two tongues respectively; one of said levers being extended rearwardly to form an operating handle to tilt the machine: substantially as set forth.

2. In a corn harvester, in combination with the main frame and the sickle supported thereon and located at the forward part thereof; a binder having its frame supported on the main frame and having its operating shafts extending fore-and-aft in vertical planes at opposite sides of the sickle's path: substantially as set forth.

3. In combination with the main frame having two carrying wheels and a sickle located at the forward part between the paths of said wheels; a binder located between the wheels having its operating shafts extending fore-and-aft at opposite sides of the sickle's path: substantially as set forth.

4. In combination with the main frame bifurcated and rearwardly open and traction wheels in its two laterally separated members and a sickle located in front of the interval between them; a binder having its operating shafts extending fore-and-aft at opposite sides of the sickle's path between the two members of the bifurcated main frame; whereby the cut corn may pass directly rearward from the sickle to and through the binder between its said operating shafts to the ground: substantially as set forth.

5. In combination with a main frame having two carrying wheels and a sickle at the forward part between the paths of the wheels, a rearwardly open binder frame having its operating shafts extending fore-and-aft at opposite sides of the path of the sickle, and its connecting trunk extended across the sickle's path behind the same: substantially as set forth.

6. In combination with the main frame having two lateral members and traction wheels in them respectively and the sickle located between the paths of the wheels at the front of the frame, a U-shaped binder frame having the trunk which connects its parallel arms extending across the sickle's path behind the same, and said parallel arms and its operating shafts extending fore-and-aft at opposite sides of the path of the sickle; said frame having its said arms provided respectively with slide-bearings on the opposite members of the main frame: substantially as set forth.

In testimony whereof we have hereunto set our hands, at Plano, Illinois, this 13th day of March, 1893, in the presence of two witnesses.

NASON M. TENNEY.
GEORGE W. HARRISON.

Witnesses:
W. H. FRILTS,
E. A. SMITH.